(12) United States Patent
Gombert

(10) Patent No.: US 6,571,436 B2
(45) Date of Patent: Jun. 3, 2003

(54) HOLDING CLIP FOR MOUNTING FUNCTIONAL ELEMENTS ON A BOLT

(75) Inventor: Stephane Gombert, Grenoble (FR)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 09/933,516

(22) Filed: Aug. 20, 2001

(65) Prior Publication Data

US 2002/0124363 A1 Sep. 12, 2002

(30) Foreign Application Priority Data

Aug. 19, 2000 (DE) .......................................... 100 40 757

(51) Int. Cl.⁷ ................................................ A44B 11/00
(52) U.S. Cl. ............................. 24/662; 24/583; 24/656; 24/666; 411/338; 411/339
(58) Field of Search .......................... 24/662, 666, 664, 24/665, 575, 580, 583, 584; 403/326, 327, 329, 274, 279, 280, 281, 282; 411/338, 339, 525, 526, 527

(56) References Cited

U.S. PATENT DOCUMENTS

| | | | | |
|---|---|---|---|---|
| 4,828,444 A | * | 5/1989 | Oshida | 411/437 |
| 4,867,400 A | * | 9/1989 | Reindl | 248/68.1 |
| 4,899,964 A | * | 2/1990 | Sick | 24/459 |
| 5,291,639 A | * | 3/1994 | Baum et al. | 24/289 |
| 5,302,070 A | * | 4/1994 | Kameyama et al. | 411/437 |
| 5,322,452 A | * | 6/1994 | Mosquera | 439/567 |
| 5,460,342 A | * | 10/1995 | Dore et al. | 248/68.1 |
| 5,533,237 A | * | 7/1996 | Higgins | 24/289 |
| 5,568,675 A | * | 10/1996 | Asami et al. | 24/297 |
| 5,660,513 A | * | 8/1997 | Shibanushi | 411/433 |
| 5,704,100 A | * | 1/1998 | Swan | 24/546 |
| 5,722,124 A | * | 3/1998 | Wisniewski | 24/295 |
| 5,816,762 A | * | 10/1998 | Miura et al. | 411/433 |
| 5,846,039 A | * | 12/1998 | Kirchen et al. | 411/34 |
| 6,070,836 A | * | 6/2000 | Battie et al. | 248/68.1 |
| 6,119,316 A | * | 9/2000 | Ishihara et al. | 24/289 |
| 6,155,762 A | * | 12/2000 | Courtin | 411/433 |
| 6,338,602 B1 | * | 1/2002 | Gombert | 411/339 |

FOREIGN PATENT DOCUMENTS

| | | |
|---|---|---|
| DE | 3408612 A1 | 9/1985 |
| DE | 199 32 862 A1 | 1/2001 |

* cited by examiner

Primary Examiner—J. J. Swann
Assistant Examiner—Andre L. Jackson
(74) Attorney, Agent, or Firm—Gifford, Krass, Groh, Sprinkle, Anderson & Citkowski, P.C.

(57) ABSTRACT

A holding clip for mounting on a longitudinally ribbed bolt having an indicator for providing an audible signal when the bolt is fully inserted. The holding clip has a flexible rod having a free end which extends transversely across a receptacle chamber. The receptacle has a transverse wall situated slightly above the rod. When the bolt is inserted, the free end of the rod is pressed upwardly to audibly impact the transverse wall. The rod may be provided with a tab which protrudes through the transverse wall so that the tab end may be tactilely sensed or visually seen.

12 Claims, 2 Drawing Sheets

HOLDING CLIP FOR MOUNTING FUNCTIONAL ELEMENTS ON A BOLT

BACKGROUND OF INVENTION

1. Field of Invention

The invention pertains to a holding clip for mounting functional elements on a bolt, in particular, on a longitudinally ribbed plastic bolt.

2. Reference to Related Art

Holding clips of this type usually contain a receptacle body for the bolt with several opposing holding lamellas that are offset in a step-shaped fashion, wherein the holding edges of the lamellas which are directed toward the center firmly adjoin the bolt wall (see DE-PS 34 08 612).

DE 199 32 862 A1 describes a similarly acting holding clip for mounting on a longitudinally ribbed plastic bolt. In that case, flexible support legs that protrude transversely downward are integrally formed onto a lower edge of the receptacle body. The support legs are spread apart when the holding clip is pressed down onto the bolt and generate a counterpressure which ensures that the holding edges engage into the bolt ribs.

In order to properly attach these prior art holding clips, it is important that the holding clip is pressed down onto the bolt to a sufficient degree. The question of whether the clip is pressed down onto the bolt "to a sufficient degree" solely depends on the subjective opinion of the assembler. Depending on the force exerted while pressing down on the clip, it is possible—for example, when the mounting points that are not clearly visible—that the bottom of the holding clip does not contact the bolt. In such instances, the clip will loosely tumble on the bolt resulting in it becoming free and separating from the bolt.

SUMMARY OF THE INVENTION

Consequently, the present invention is based on the objective of designing a holding clip in such a way that the assembler is provided with a reliable indication of a correctly performed mounting process. Preferably, this objective is attained by extending a flexible rod transversely over a receptacle chamber that is integrally formed onto one side wall above the holding lamellas. The free end of the flexible rod extends up to a point that is situated slightly underneath a projection on the opposite side wall. The receptacle chamber is covered by a transverse wall slightly above the rod. A free rod end audibly impacts on this transverse wall after it has passed the projection during the insertion of the bolt.

It will be appreciated that the audible impact of the rod might not be sufficiently loud in light of the general noise level in an assembly hall. Therefore, in an alternative embodiment, an upwardly protruding hammer-like tab is integrally formed onto the upper side of the rod a short distance before its free end. Additionally, a corresponding recess is provided in the transverse wall above the tab. The tab engages into the recess through the rod when it passes the projection. Therefore, the assembler is, in addition to perceiving an audible impact, also able to sense the engagement of the hammer-like tab in the recess with the tip of his or her thumb.

The sensation of this confirmation of a properly performed mounting process can, according to another characteristic of the invention, be intensified by dimensioning the height of the tab such that the tip of the tab protrudes from the upper side of the transverse wall by a short distance after it engages into the recess. In addition to intensifying the impact on the tip of the thumb, the protruding tip visually indicates that the web has passed the projection.

DESCRIPTION OF THE DRAWINGS

Several embodiments of the invention are illustrated in the figures and described in greater detail below. The figures show.

DETAILED DESCRIPTION

Referring now to FIGS. 1–4, there is shown a preferred embodiment for a holding clip for mounting functional elements on a bolt 1, in particular, a longitudinally ribbed plastic bolt. Preferably, the clip includes a receptacle body 2 that accommodates the bolt 1 and a rod-like holding means 3 for the functional elements that are not illustrated in the figures, wherein the holding means are integrally formed onto the receptacle body 2. The functional elements may, for example, include cable harnesses that are fixed on the holding rods 3 by means of an adhesive tape.

Figure 1:
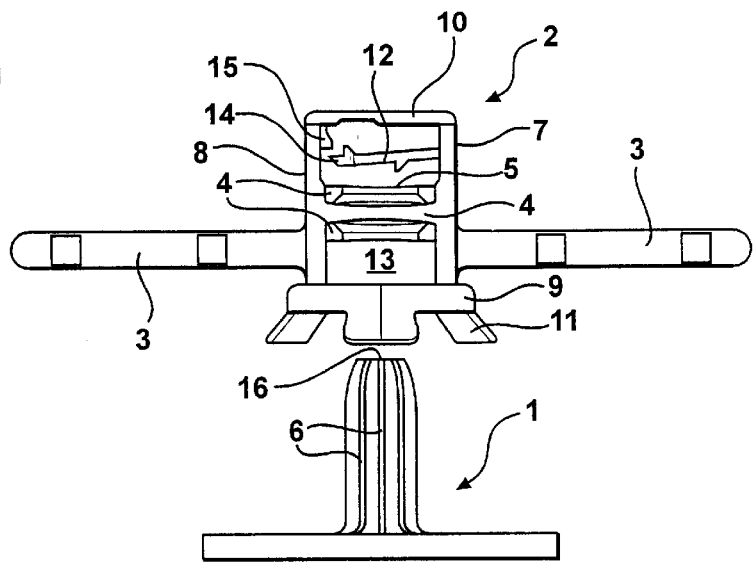
FIG. 1, a side view of a holding clip before it is pressed down onto a longitudinally ribbed plastic bolt.
Figure 2:
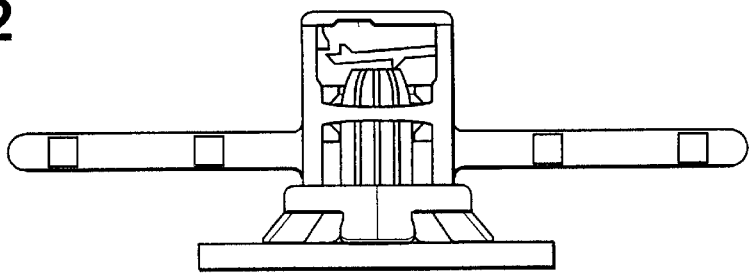
FIG. 2, the same holding clip while it is pressed down onto the plastic bolt.
Figure 3:
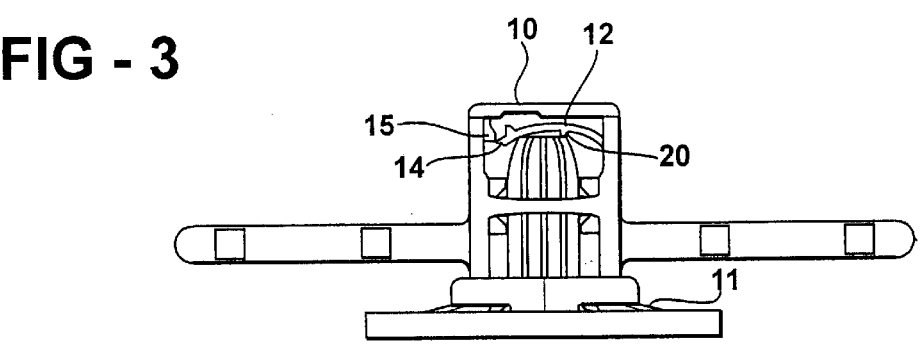
FIG. 3, the same holding clip while it is pressed down, namely shortly before it reaches the end position.
Figure 4:
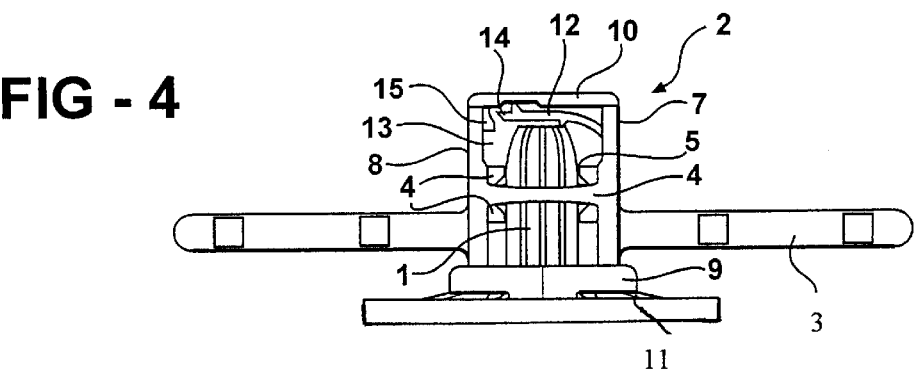
FIG. 4, the same holding clip in the end position, in which the rod is forced upward.

Preferably, the receptacle body 2 is provided with several opposing holding lamellas 4 that are offset in a step-shaped fashion and contain semicircular holding edges 5 that are directed toward the center. As seen in FIG. 4, following the pressing of the holding clip onto the longitudinally ribbed bolt, the holding edges 5 adjoin the bolt ribs 6. The holding lamellas 4 are preferably arranged between two side walls 7 and 8 that terminate on a lower end in the form of a circular edge 9 and are covered on an upper end by a transverse wall 10. Three flexible support legs 11 protrude transversely downward and are integrally formed onto the edge 9 of the receptacle body 2. The support legs are spread apart when the holding clip is pressed down onto the bolt and thusly generate a counterpressure. The holding edges 5 of the lamellas 4 are directed transversely upward in such a way that they engage the bolt ribs 6 and generate a counterpressure that ensures a rigid anchoring of the holding clip on the bolt 1.

A flexible rod 12 transversely extends over the receptacle chamber 13 and is integrally formed onto the side wall 7 above the holding lamellas 4. A free springable end 14 of the rod 12 ends slightly underneath a projection 15 that is integrally formed onto the opposite side wall 8. Preferably, the transverse wall 10 covers the receptacle chamber 13 slightly above the rod 12. During insertion of the bolt 1 into the receptacle chamber 13, the free rod end 14 is pressed upward by the end face 16 of the bolt 1 (FIGS. 2 and 3) and audibly impacts on the transverse wall 10 (FIG. 4) after passing the projection 15.

Figure 5:
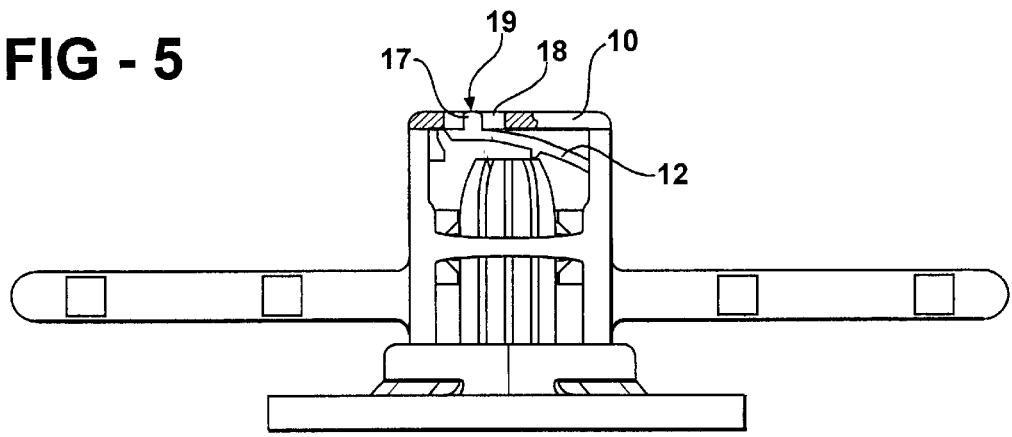
FIG. 5, the holding clip in the same mounting position, namely with a hammer-like tab on the free end of the rod which engages into a recess.
Figure 6:
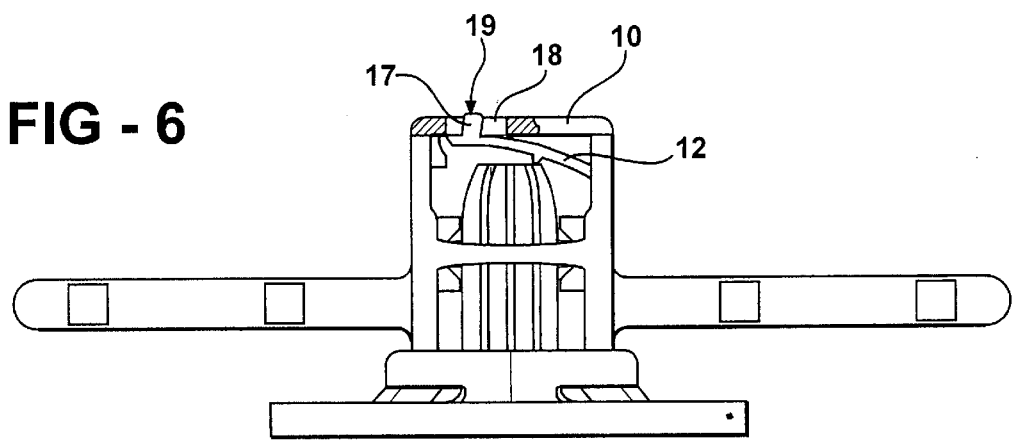
FIG. 6, the holding clip in the same mounting position, namely with the tip of the tab protruding from the recess, and FIG. 7, an example for mounting a holding clip that is arranged in a mounting bowl.
Figure 7:
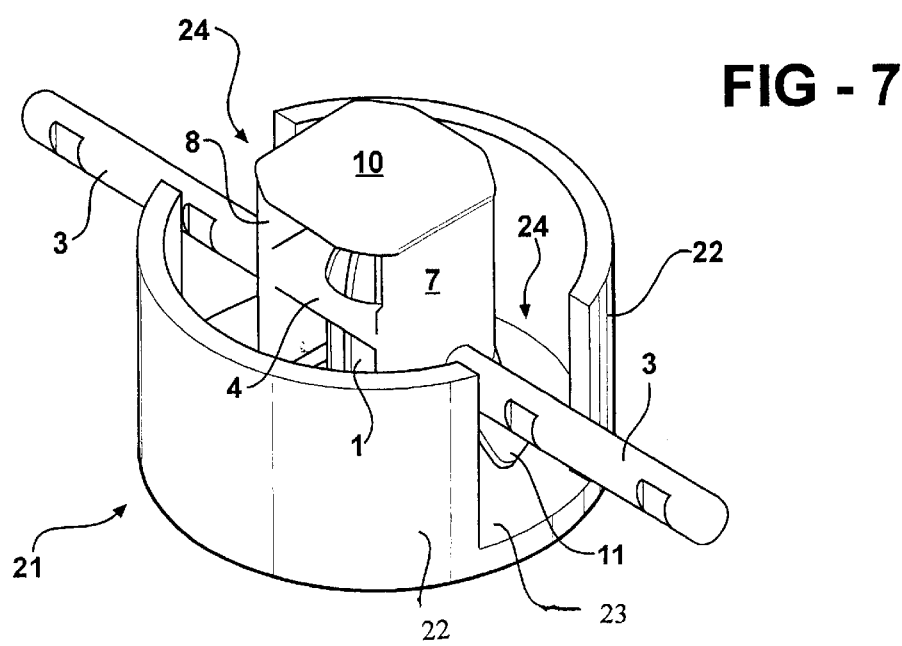

Referring now to FIGS. 5–7, there is shown an alternative embodiment of the present invention. In the alternative embodiment, an upwardly protruding hammer-like tab 17 is provided on the upper side of the rod 12. The tab is preferably positioned a short distance before the end 14. A corresponding recess 18 into which the tab 17 engages after passing the projection 15 is arranged in the transverse wall 10. The tab 17 not only produces an audible impact, but the assembler is also able to advantageously sense the tip 19 of the tab 17 engaging into the recess 18 with the thumb.

Referring now to FIG. 6, the height of the tab 17 may be adjusted such that the tip 19 of the tab 17 slightly protrudes from the upper side of the transverse wall 10 after it engages into the recess 18. Therefore, the protruding tip 19 of the tab can be sensed in a superior fashion. In addition, this provides a visual indication for the correct mounting of the holding clip.

In all embodiments, the rod 12 contains one additional support tab 20 that is spaced apart from the upper tab 17 and arranged on its underside facing the bolt 1. This support tab 20 contacts the end face 16 of the bolt 1 when the bolt is inserted into the clip which results in an optimal bending and prestress of the rod 12.

Referring now to FIG. 7, there is shown one advantageous example for mounting the holding clip according to the invention. The mounting clip is arranged in a separate mounting bowl 21 having two semicircular side walls 22 that are connected to one another via a common base plate 23. A through-hole 24 for the rod-shaped holding means 3 is recessed in both directions between the side walls 22. The holding means may, for example, be used for holding a cable harness that is fixed on the holding rods 3 by means of an adhesive tape.

I claim:

1. A holding clip for mounting functional elements on a bolt, the holding clip comprising:
   a receptacle body having a lower edge, the body having at least a pair of spaced apart side walls and a transverse wall portion extending from one of the pair of side walls to an other of the pair of side walls, the side walls and transverse portion together defining a receptacle chamber for receiving the bolt;
   at least one flexible support leg extending from the lower edge of the receptacle body;
   a projection defined on and extending inwardly from one of the side walls of the receptacle body;
   a flexible member attached to one of the side walls and having a free end extending into the receptacle chamber, the free end being positioned on one side of the projection, the free end of the flexible member being adapted to be pushed past the projection and audibly impact on the transverse wall portion when the bolt is inserted into the receptacle chamber; and
   a holder connected to the receptacle body for securing the functional elements.

2. The holding clip of claim 1, wherein the receptacle body, the at least one flexible support leg, the projection, the flexible member, and the holder are integrally formed.

3. The holding clip of claim 1, wherein the at least one flexible support leg, extend downwardly and outwardly from the lower edge of the receptacle body.

4. The holding clip of claim 1, wherein the receptacle body further comprises engagement members for engaging a wall of the bolt when it is inserted into the receptacle chamber.

5. The holding clip of claim 1, wherein the flexible member further comprises a protruding hammer-like tab positioned proximate the free end and the transverse wall has a recess defined therein, the tab engaging the recess after the free end is pushed past the projection.

6. The holding clip of claim 5, wherein the transverse wall has an upper surface and the recess in the transverse wall extends through the transverse wall, the protruding hammer-like tab having a height dimension such that the tab protrudes through the recess and beyond the upper surface of the transverse wall.

7. The holding clip of claim 5, wherein the flexible member further comprises a support tab positioned on an underside of the flexible member and laterally spaced from the protruding hammer-like tab, the support tab being adapted to contact an end face of the bolt when the bolt is inserted into the receptacle chamber.

8. A holding clip for mounting functional elements on a bolt, the holding clip comprising:
   a receptacle body having a lower edge, the body comprising at least a pair of side walls and a transverse wall extending between the side walls, the side walls and transverse wall together defining a receptacle chamber for receiving the bolt, the transverse wall having a recess;
   a projection defined on and extending inwardly from one of the side walls of the receptacle body;
   a flexible member having a base attached to one of the side walls and a free end extending into the receptacle chamber, the free end being positioned on one side of the projection, the free end of the flexible member having a protruding hammer-like tab positioned proximate the free end, the tab being adapted to be pushed past the projection and audibly impact on the recess of the transverse wall when the bolt is inserted into the receptacle chamber; and
   a holder connected to the receptacle body for securing the functional elements.

9. The holding clip of claim 8, wherein the receptacle body having a pair of flexible support legs extending downwardly and outwardly from the lower edge of the receptacle body.

10. The holding clip of claim 8, wherein the receptacle body further comprises engagement members for engaging a wall of the bolt when it is inserted into the receptacle chamber.

11. The holding clip of claim 10, wherein the transverse wall has an upper surface and the recess in the transverse wall extends through the transverse wall, the protruding hammer-like tab having a height dimension such that the tab protrudes through the recess and beyond the upper surface of the transverse wall.

12. The holding clip of claim 10, wherein the flexible member further comprises a support tab positioned on an underside of the flexible member and laterally spaced from the protruding hammer-like tab, the support tab being adapted to contact an end face of the bolt when the bolt is inserted into the receptacle chamber.

\* \* \* \* \*